1 MICRON

S

1 MICRON

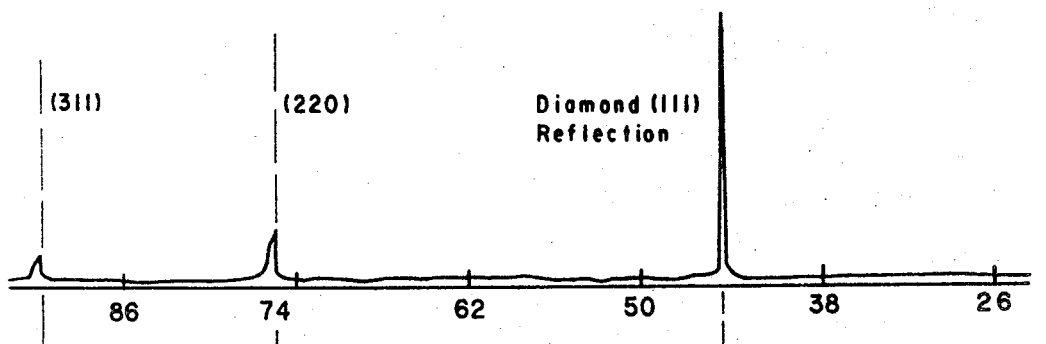
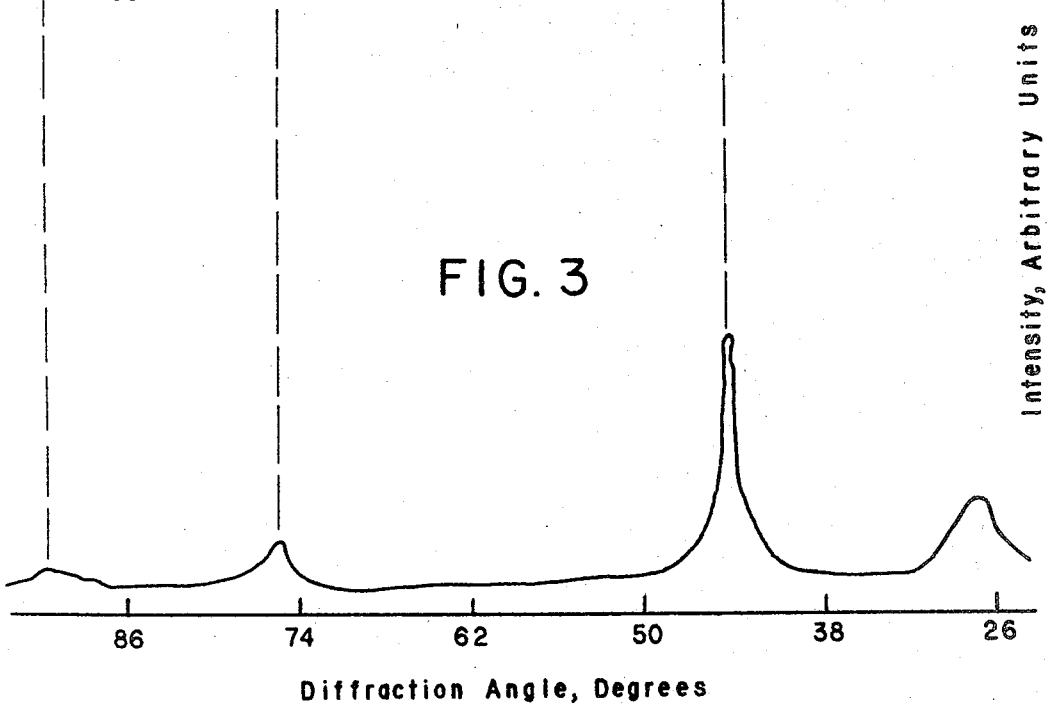

FIG. 5
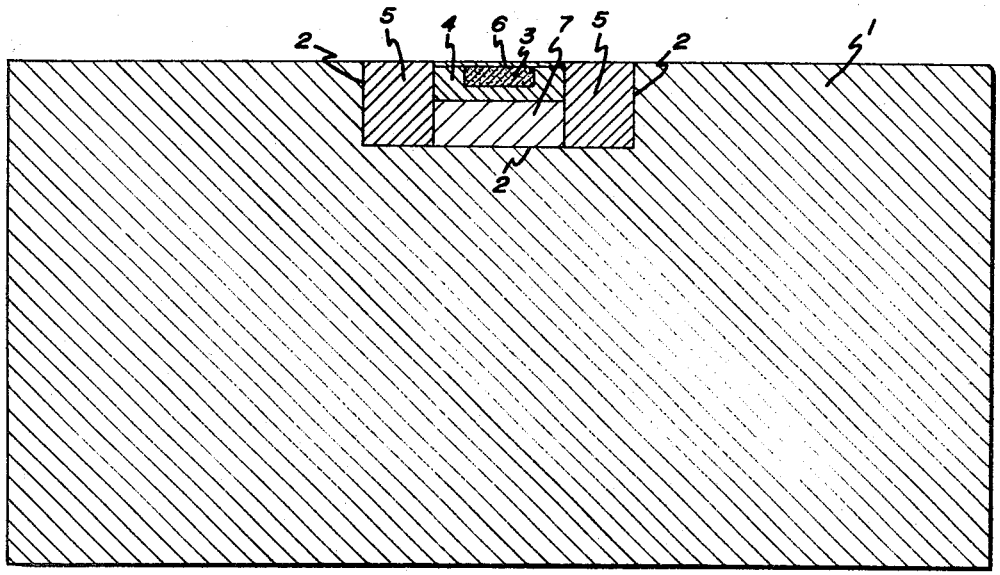
INVENTOR.
BRUCE W. DUNNINGTON
BY
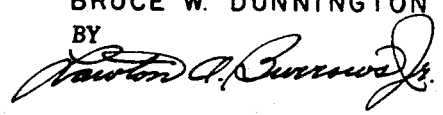
ATTORNEY

United States Patent Office 3,399,254
Patented Aug. 27, 1968

3,399,254
PROCESS FOR SINTERING DIAMOND PARTICLES
Bruce W. Dunnington, West Chester, Pa., assignor to E. I. du Pont de Nemours and Company, Wilmington, Del., a corporation of Delaware
Continuation-in-part of application Ser. No. 368,539, May 19, 1964. This application Nov. 24, 1965, Ser. No. 516,201
8 Claims. (Cl. 264—84)

ABSTRACT OF THE DISCLOSURE

Polycrystalline sintered diamond consisting essentially of initially distinct diamond particles bonded directly to each other, and which has a particle density equal to at least about 80% of the crystal density of diamond and produces an X-ray diffraction pattern wherein the diffraction lines for diamond exhibit certain broadening. The sintered diamond is prepared by subjecting diamond powder to a shock wave at a pressure of at least about 300 kilobars.

---

This application is a continuation-in-part of my copending application Ser. No. 368,539, filed May 19, 1964, and now abandoned.

Diamond, both natural and synthetic, has acquired a recognized importance in technology, based largely on its extreme hardness. Much diamond is available in the form of a fine powder or dust, known as diamond dust. The average particle size of this material generally is about 10 microns or less. While diamond dust finds use as an abrasive for smoothing and polishing, it would acquire increased technological importance if the particles could be formed into strong compact aggregates of a size large enough to be used for other operations such as for cutting and shaping wheels, diamond saws, diamond drill heads, etc.

A technique used widely in powder technology for transforming powders into strong dense agglomerates is known as sintering. Sintering may be defined as the welding together of, and growth of contact area between, two or more initially distinct particles at temperatures below the melting point of the substance. With most technologically important substances, the formation of strong sintered products requires either subjecting a cold-pressed powder to elevated temperatures, or pressing and heating the powder simultaneously. In the case of diamond, however, conventional sintering techniques have proved ineffectual since the time-temperature conditions required in these methods to effect a welding together of diamond particles have been such as to cause a transformation of the diamond into graphite. Therefore, a sintering process which overcomes the deficiencies of the prior art procedures and permits the formation of a technically valuable sintered polycrystalline diamond product is of great interest to the art of powder technology.

The present invention provides a method of sintering diamond which comprises subjecting a mass of diamond powder to a shock wave at a pressure of at least about 300 kilobars, said mass having a bulk density of at least about 40 percent of the crystalline density of diamond (3.51 g./cc.), and said diamond powder having an average particle size up to about 150 microns. The shock wave required for sintering the diamond particles is produced in the mass of diamond powder by applying a shock pressure pulse over at least one surface of the powder mass, "over" meaning that substantially the entire area of such surface is subjected to the pressure pulse. As used herein and in the claims, "shock pressure pulse" means a pressure pulse which: (a) is characterized by an almost instantaneous pressure rise and, therefore, can produce a shock wave in the diamond powder when applied over one of its surfaces; and (b) is applied to such surface of the diamond powder by impacting it with (i) a high-velocity projectile plate or (ii) a shock wave generated at an exterior surface of a container in which the powder is enclosed by the impact of a detonation wave or high-velocity projectile plate with such exterior surface. A "detonation wave" is the pressure wave produced by detonating an explosive. According to a preferred procedure for carrying out the method of this invention, a shock wave is introduced into the mass of diamond powder by the impact of a high-velocity projectile plate with a surface of the amassed powder or a surface of a confining means or container for the powder.

This invention also provides a polycrystalline diamond product containing diamond crystals sintered together, the sintered product (exclusive of unsintered starting material) having a particle density equal to at least about 80 percent of the crystal density of diamond and producing an X-ray diffraction pattern wherein the diffraction lines for diamond have a broadening coefficient, K' of from $4.5 \times 10^{-2}$ to $7.5 \times 10^{-4}$ as calculated from the expression:

$$K' = \frac{\beta \cos \theta}{\lambda}$$

where $\beta$ is the pure angular breadth in radians of a powder reflection free of all broadening due to the experimental method employed in observing it, $\lambda$ is the wavelength in Angstroms of the monochromatized CuK$\alpha$ radiation X-rays employed to obtain the diffraction, and $2\theta$ is the angle of deviation of the diffracted beam.

A more complete understanding of the product and process of this invention may be had by reference to the accompanying drawings wherein FIGURES 1 and 2 are photomicrographs of the polycrystalline diamond of this invention made by sintering 1-micron natural diamond, the magnification in FIGURE 1 being 15,200 times, and that in FIGURE 2, 64,000 times;

FIGURE 3 is the X-ray diffraction pattern of the product shown in FIGURES 1 and 2;

FIGURE 4 is the X-ray diffraction pattern of natural diamond; and

FIGURE 5 is a cross-sectional view of an assembly which can be employed in carrying out the present process.

Figure 1:
Figure 2:
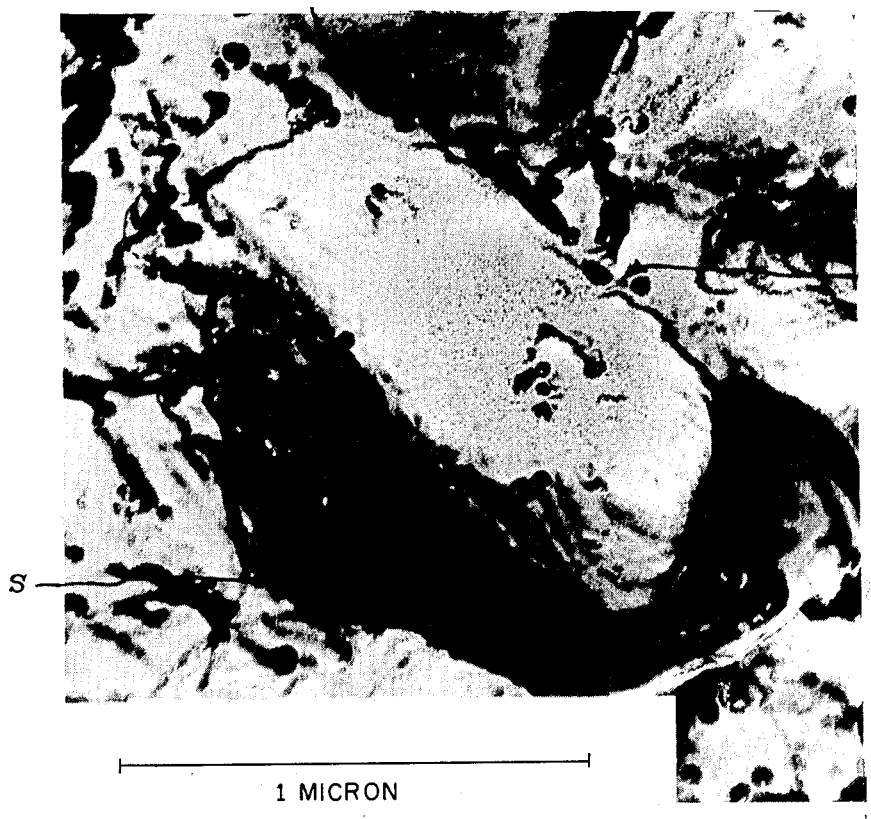

Referring now to the drawings in greater detail, FIGURE 1 reveals a high-density structure with extensive interparticle growth. In FIGURE 2, arrows S indicate the areas where intercrystalline bonds have been formed, showing that sintering has occurred.

A comparison of the X-ray diffraction patterns shown in FIGURES 3 and 4 reveals that the sintered product of this invention exhibts much broader diffraction lines at the angles of greatest intensity than does unsintered natural diamond. In order to obtain the pattern in FIGURE 3 a higher X-ray intensity was used than for the diamond whose pattern is shown in FIGURE 4. With the same X-ray intensity the peaks in FIGURE 3 would be much lower. Therefore, the diffraction lines of the present product are broader and less intense than those of the product whose pattern is shown in FIGURE 4.

In FIGURE 5, a solid cylindrical block 1 of dense, ductile metal which has high resistance to fracture by shock produced by impact, for example a lead block, has a cylindrical cavity therein defined by the internal surfaces of the block denoted by 2. A plug assembly within cavity 2 is comprised of (a) a cup-shaped member 4 which encases powdered diamond 3 amassed in the form of a circular disc, (b) a ring 5 surrounding cup-shaped member 4, and (c) protective cover plate 6, covering the cup-shaped member and disc. Cup-shaped member 4 and cover plate 6 form a containing-means for powder 3. Cup-shaped member 4, cover plate 6, and ring 5 are made of a tough metal such as steel, and plate 6 preferably is securely attached to cup 4, e.g., by welding. The remaining portion of the cavity is filled with a dense, ductile metal filler member 7, e.g., of lead. This assembly finds great utility for confining and retaining a powdered material subjected to a shock wave produced by the impact of a high-velocity projectile plate.

In the preferred embodiment of the present process a high-velocity metal projectile plate collides with a surface of a mass of diamond powder, or of a container therefor, the powder being amassed to a bulk density of at least about 40 percent of the crystalline density of diamond, and the plate velocity on collision being such that the diamond powder is subjected to a shock pressure of at least about 300 kilobars. This is believed to be the minimum shock pressure which will effect extensive bonding between diamond particles throughout a mass of diamond powder having a bulk density equal to about 40% of the crystalline density of diamond. For a powder of a given density, use of higher stock pressures leads to higher temperatures at which graphitization of the diamond may become significant, leading to a weaker product. While pressures somewhat higher than the minimum required for a powder of a particular density can be used, there appears to be no advantage to be gained by exceeding about 2000 kilobars even in the case of high-density powder where shock heating is less. With lower-density powder, the maximum useful pressure will be lower. As a practical matter, bulk densities of about 45–55% will be employed because they are readily obtainable using static pressing techniques. With powder samples of such densities, it has been found that pressures of at least about 600 kilobars are preferred.

While I do not intend that my invention shall be limited by any discussion of theoretical considerations, I believe that the success achieved in the present process where conventional processes have failed to related to the violent motion, slippage, and shear processes associated with the high-pressure shock wave introduced into the powder and to the localized extremely high pressures and localized high temperatures occurring in the shock front, temperature equilibration in the powder occurring while the average pressure is still high enough to keep the diamond stable.

The diamond powder to be sintered can be natural or synthetic diamond, or a mixture of both types, and preferably is in the form of generally equant particles all of substantially the same size. Particles of this type assure a more uniform product. While the powder can be pure diamond, it will generally contain minor amounts of the impurities normally associated with natural or synthetic diamond, as the case may be, e.g., graphite and metals. Such impurities should constitute less than about 10%, preferably less than about 5%, by weight of the diamond powder. The purity of the sintered product will be substantially the same as that of the diamond powder from which it is prepared. It is preferred that the surfaces of the powder be free of contaminants such as grease or moisture which may interfere with effective sintering of the crystals.

The diamond powder should be amassed to a bulk density of at least about 40 percent of its crystalline density prior to passage of the shock wave therethrough. Lower densities are undesirable because of nonuniformity in the distribution of voids in the product, and because of unduly high local temperatures induced by collapse of the large voids by the shock wave. Higher densities can be employed where attainable. The particle size of the diamond powder to be sintered preferably is no greater than about 150 microns. Larger crystals may sinter to some degree but generally do not give a strong dense product. The particle size which will be employed in any particular case depends on the size of the powder which one has available, e.g., 1–10 microns if the powder is diamond dust.

A number of conditions determine the pressure of the shock wave passing through the diamond powder. These include the velocity and shock impedance of the metal projectile plate and the shock impedance of the diamond powder. When a material is compressed by a shock wave, the "shock impedance" is equal to the initial density of the material times the velocity of the shock wave passed through it, and thus varies with pressure. Higher shock pressures are attained with higher plate velocities, higher-impedance plate materials, and higher-density masses of powder. Projectile plates of relatively high-impedance materials such as the various steels, copper, nickel, titanium, zinc, and their allows are preferred in the present process because they afford higher pressures than lower-impedance materials at a given plate velocity. However, it should be understood that the process of this invention is not limited to the use of the aforementioned materials for the projectile plate. Any material can be employed which will provide the required pressure at the plate velocity and powder density used. The term "plate" is used herein to denote a solid object having two essentially parallel surfaces, i.e., parallel or substantially parallel, of the same or about the same area, the distance between the parallel surfaces being short relative to the dimensions of the surfaces. "Parallel" surfaces denotes flat as well as curved surfaces. However flat plates are more practical. These parallel surfaces are referred to herein as the "acting surfaces" of the plate since they are the surfaces involved in the action which takes place during the process.

The projectile plate is impelled in a manner such that one of the acting surfaces, or a portion thereof, contacts the surface of the amassed diamond powder or its container. Obviously, scattering of the powder must be prevented, for example by evacuating the space between the plate and the powder and/or by placing the powder in a suitable protective assembly. Using such expedients, the plate can be driven directly against the surface of the powder. A preferred means of preventing scattering of the powder is to confine it in a container and impel the plate against the container surface.

The alignment and configuration of the plate and mass of powder (or its container) are such that upon impact of the plate with the powder (or container), their contacting surfaces form a continuous interface which is coextensive with the surface of the powder to be treated, measured in the same direction as the interface.

The projectile plate is impelled to the desired velocity by the detonation of a condensed, i.e., a solid or liquid, high explosive in contact with the acting surface of the plate farthest from the powder or container surface. The particular plate velocity achieved in any case will depend on the mass of explosive used, the mass of the plate, and the escape velocity of the detonation products. The higher the ratio of the mass of explosive to the mass of the plate, the higher the plate velocity attained. Explosives which upon detonation give products having high escape velocities give higher plate velocities.

As has been stated previously, a parameter affecting the shock pressure achieved is the shock impedance of the plate. The plate velocity which can be achieved with any set of conditions can be determined experimentally, for example by employing any of the known techniques for measuring free-surface velocities. Such techniques include smear or streak camera measurements and flash X-ray photography. Both of these methods allow computation of velocities directly from measured angles on the records obtained thereby. The shock pressure introduced into the diamond powder can be estimated from the plate velocity and the pressure-particle velocity relationships for the plate and for the diamond powder when a shock traverses the boundary between the two materials. The pressure and particle velocity are continuous across this interface, the continuity being represented by the intersection of two Hugoniot curves in the pressure-particle velocity plane (a curve which is the locus of all possible states which can be attained by shocking the material from the original state), one curve for a forward-facing shock in the diamond starting at zero pressure and zero particle velocity, and one curve for a backward-facing shock in the projectile plate starting at zero pressure and particle velocity equal to the plate velocity. The Hugoniot curves for many metals are published and are readily available. Although a Hugoniot curve for diamond is not available, one for graphite was published by B. J. Alder and R. H. Christian in Physical Review Letters 7, No. 10, p. 368 (1961). The authors indicate a conversion of graphite to diamond over a pressure range of 0.4–0.6 megabar. This portion of the Hugoniot curve can be used as the Hugoniot curve for diamond provided that the initial density of the diamond is the same as that of the graphite used by Alder and Christian.

The Hugoniot for diamond of initially different bulk density is estimated by using the Mie-Grüneisen equation of state (Grüneisen constant of 0.9) and the Dugdale-MacDonald relationship, assuming a constant ratio of the Grüneisen parameter to specific volume ($\gamma/V$), as described by R. G. McQueen and S. P. Marsh, Journal of Applied Physics, 31 (7), 1253 (1960), and W. E. Deal, Jr., Modern Very High Pressure Techniques, Wentorf, R. H., Editor, Butterworths, London (1962), pages 200–207. The shock pressures disclosed herein, including those given in Examples 1–6, are calculated from Hugoniot curves for diamond determined by this method.

For a particular pressure, P, and specific volume, V, in the shocked state, taken from the $P/V$ curve, the particle velocity of the diamond is calculated from the equation:

$$U_p^2 = (P - P_o)(V_o - V)$$

which is obtained by combining the mass conservation relation $$\frac{V}{V_o} = \frac{(U_s - U_p)}{U_s}$$

and the momentum conservation relation $$P - P_o = \frac{U_s U_p}{V_o}$$

in which $V_o$ and $P_o$ are volume and pressure ahead of the shock ($V_o$ is the reciprocal of the initial diamond density and $P_o = 0$), $U_p$ is particle velocity, and $U_s$ is shock velocity. By obtaining a number of $U_p$ values from different P-V combinations, the pressure-particle velocity curve for diamond can be plotted, and the shock pressure at the plate-diamond interface then is given for a particular $V_o$ by the intersection of the pressure-particle velocity Hugoniot curves for the forward-facing and backward-facing shocks described above.

When a covered container for the diamond powder is employed, the shock impedance of the cover portion has an effect on the shock pressure introduced into the powder. If the shock impedance of this material is substantially the same as that of the projectile plate, the shock pressure in the diamond powder will be substantially the same as that resulting when said material is absent and the powder is impacted directly, provided the thickness of the cover portion is not so great that the shock wave is attenuated by a rarefaction wave from the back of the projectile plate prior to reaching the powder. On the other hand, if the shock impedance of the intervening material is intermediate that of the projectile plate and that of the diamond powder, the pressure introduced into the diamond powder will be higher than that produced by direct impact; whereas if the intervening material has a shock impedance which is higher than that of the projectile plate or lower than that of the diamond powder, the pressure introduced into the diamond powder will be lower than that which could be achieved by direct impact.

The pressure of the shock wave entering the cover of the container is determined by the method described above for the direct-impact technique, using in this case the intersection of the pressure-particle velocity Hugoniot curves for a forward-facing shock in the container material (starting at zero pressure and zero particle velocity) and a backward-facing shock in the projectile plate (starting at zero pressure and particle velocity equal to the plate velocity). The shock pressure in the diamond powder is then given by the intersection of the pressure-particle velocity Hugoniot curve for a forward-facing shock in the diamond (starting at zero pressure and zero particle velocity) and the reflection of the pressure-particle velocity Hugoniot curve for a backward-facing shock in the container material, the latter curve passing through the previously found intersection point of the P-$U_p$ curves for the projectile plate-container interface.

The shock impedance of the material in contact with the surface of the diamond powder opposite that into which the shock wave initially enters (e.g., the base of the powder container) also has an effect on the shock pressure to which the powder is subjected. If such material has a higher shock impedance than the unshocked diamond, the pressure of the shock reflected from the diamond-base interface will be higher than that of the initial shock provided the thickness of the powder is not so great that the initial shock becomes attenuated by the rarefaction wave from the back of the projectile plate prior to reaching said interface. Before shock attenuation occurs, other compressive reflections back and forth through the diamond can take place to produce higher reflected shock pressures. The shock pressure obtained upon reflection from the base of the container is obtained from the intersection in the pressure-particle velocity plane of the Hugoniot curve for a forward-facing shock in the base material starting at zero pressure and zero particle velocity with the Hugoniot curve of a backward-facing shock in the diamond (already shock-compressed) starting at the intersection of the pressure particle velocity curves for the diamond-cover plate interface or diamond-projectile plate interface, as the case may be. Pressure produced by any further reflection is estimated in an equivalent manner.

In computing the pressure produced by reflection, the Hugoniot for the compressed diamond powder through which the shock wave has just passed is estimated by using the Grüneisen equation as described above the assuming that the compressed powder is 100% dense thereby making the ratio ($\gamma/V$) for such powder 3.16 g./cc., which, as already noted, is assumed to be constant.

Since the shock pressure introduced into the diamond powder depends on the velocity and shock impedance of the projectile plate and on the shock impedance of the diamond powder, for a given plate material and diamond powder of a given density a simpler and more direct way of defining the requisite shock conditions is in terms of the plate velocity. For example, in systems employing a plate having a shock impedance of about $4$–$5 \times 10^6$ dyne-sec./cm.$^3$, e.g., steel, diamond powder amassed to the minimum density of about 40% of the theoretical, a base material having a higher shock impedance than the unshocked diamond, and direct impact of the powder or of an intervening material having the same shock impedance as the projectile plate, plate velocities as low as about 2.5 km./sec. can be employed, velocities of at least about 3.0 km./sec. being preferred. Generally speaking, higher plate velocities will be used with powders of higher density although the effect of plate velocity on the properties of the product produced from highly compacted powder, i.e., greater than about 85% of the theoretical, is less apparent. Generally there will be no advantage to using plate velocities exceeding about 6 kilometers per second.

In order to assure that the entire mass of powder is subjected to sufficiently high pressure, a shock wave at this pressure should pass through the entire sample. The shock-pressure duration is controlled chiefly by the thickness of the projectile plate. More specifically, a shock front travels back into the projectile plate from the impact surface, reaches the back face of the plate, and is reflected back to the impact surface as a rarefaction wave, this wave then entering the powder, or container, and attenuating the shock wave therein. Obviously, it is desirable that a shock wave of the requisite pressure traverse the entire mass of powder before the rarefaction wave can overtake it and reduce the pressure below that at which sintering will occur. In order to be able to determine for a particular set of conditions whether the rarefaction will overtake the shock wave in the diamond powder, one must know the shock velocity ($U_s$) and rarefaction velocity ($U_r$) measured in the coordinate system at rest. The $U_r/U_s$ ratio increases with the porosity of the powder. It can be determined for the plate material and the powder from $\rho/\rho_0$, the ratio of the density of the material behind the shock to that of the material ahead of the shock, and the sonic velocity, $C_H$, of the material on the Hugoniot curve, according to:

$$U_r = \frac{\rho}{\rho_0} \cdot C_H$$

Values for $U_r$ and $U_s$ can be calculated from the published values for $\rho/\rho_0$ and $C_H$ as can be found in the McQueen and Marsh publication mentioned previously, or estimated from Hugoniot curves experimentally determined by the method described in that publication. Shock velocity values also can be found by measurement according to known techniques, such as smear or streak camera measurements. Knowing $U_s$ and $U_r$ for both the plate and the powder, one can determine whether the rarefaction will overtake the shock wave in the powder. If necessary, the condition can be remedied by choosing a thicker projectile plate. Duration times of maximum pressure at the impact interface for steel projectile plates of various thicknesses and velocities are shown in the following table:

| Plate thickness (in.) | Plate velocity (km./sec.) | Shock pressure on impact with a steel plate (kilobars) | $U_s$ (km./sec.) | $U_r$ (assumed to be 1.2 $U_s$) (km./sec.) | Shock duration (microsec.) |
|---|---|---|---|---|---|
| 0.1 | 2 | 430 | 5.46 | 6.55 | .85 |
| 0.1 | 3 | 710 | 6.50 | 7.80 | .72 |
| 0.1 | 4 | 1,070 | 7.84 | 9.40 | .59 |
| 0.2 | 2 | 430 | 5.46 | 6.55 | 1.70 |
| 0.2 | 3 | 710 | 6.50 | 7.80 | 1.44 |
| 0.2 | 4 | 1,070 | 7.84 | 9.40 | 1.18 |

For the plate velocities required to achieve the pressures necessary in the present process, and on the basis of practical considerations regarding the thickness of the powdered mass, it generally will be necessary to have a shock duration of at least about 0.1 microsecond. Longer durations can be used and may in some cases be preferred, particularly when lower shock pressures are employed. For example, durations as long as about 5 microseconds can be used. In any case, if a container is used, the thickness of the container between the impact surface and the powder must be considered in the determination of the conditions required to assure proper shock duration. In general a container thickness greater than about twice the thickness of the projectile plate will not be used.

Any of the well-known high explosives, e.g., TNT, RDX, HMX, PETN, nitroglycerin, and mixtures containing them can be used to impel the projectile plate so long as they can be provided as a uniform layer, uniformity being desirable to achieve uniform results. Self-supporting explosive compositions such as those described in U.S. Patents 2,992,087 and 2,999,743 can be used in this process since they are readily formed into easily handled, tough, flexible sheets having a uniform quantity of explosive per unit area. Castable explosives, for example those like amatol (TNT-ammonium nitrate mixture) or cyclotol (a TNT-RDX mixture), naturally may be readily cast into charges for use in the present process. The following table shows the velocities at which 10-inch-diameter flat circular steel (SAE 1010) plates of different thicknesses can be driven by 10-inch-diameter flat circular layers of explosive of different thicknesses (i.e., different masses of explosive). The explosive in this case is a sheet explosive described in U.S. Patent 2,999,743, which has a detonation velocity of about 7500 meters per second.

| Explosive mass (g./sq. in.) | Plate thickness (in.) | Plate velocity (km./sec.) |
|---|---|---|
| 25 | 0.15 | 2.1 |
| 25 | 0.09 | 2.6 |
| 25 | 0.03 | 3.7 |
| 50 | 0.21 | 2.4 |
| 50 | 0.12 | 2.9 |
| 50 | 0.06 | 3.7 |
| 100 | 0.27 | 2.9 |
| 100 | 0.15 | 3.5 |
| 100 | 0.09 | 4.1 |

The explosive layer can be initated by any conventional initiating device. The mode of initiation and the respective initial positions of the surfaces which are to collide determine whether these surfaces will be parallel or oblique to each other at collision. Generally, it is easier to set up for parallel collision by aligning the plate parallel to the surface of the powder or container and simultaneously initiating the whole layer of explosive with a surface-wave generator (e.g., one of those described in U.S. Patents 2,887,052, 2,999,458, and 3,016,831).

The distance travelled by the projectile plate prior to collision should be that which allows the plate to attain the velocity calculated to give the desired shock pressure. This distance depends on such factors as the strength of the explosive and the plate thickness. Generally a distance at least about equal to the plate thickness is required.

Although the mode of operation of the process of the invention has been described specifically with reference to the preferred high-velocity projectile plate technique for generating shock waves in diamond powder, other shock-wave-generating procedures can be employed in the present process provided they are capable of producing shock waves of the required pressure and duration to effect sintering of the diamond powder. For example, converging shock waves can be used such as can be produced by detonating a layer of explosive in contact with a container for the diamond powder, the explosive layer surrounding the container, e.g., in the case of a tubular container, or positioned on opposite sides of the container, e.g., in the case of a parallelepiped container.

The sintered product obtained by use of the present process is identified as polycrystalline diamond by comparing the diffraction angles and the intensity of the reflection on its X-ray diffraction pattern with those published for diamond. Although the diffraction pattern enables this identification to be made, the diffraction lines for diamond in the product of this invention differ substantially from those obtained with conventional diamond being both broader and less intense than those of conventional diamond.

The pure breadth of a diffraction line ($\beta$) is readily determined by procedures described in detail in standard texts such as X-ray Diffraction Procedures, Klug, H. P. and Alexander, L. E., New York, John Wiley & Sons, 1954. With respect to the diffraction line breadth, the diamond product of this invention is described by the above equation. $K'$, designated the line broadening coefficient, is a function characteristic of the product and the nature of the radiation used. For monochromatized CuK$\alpha$ radiation, the range of permissible values for $K'$ is $4.5 \times 10^{-2}$ to $7.5 \times 10^{-4}$.

The broader and less intense diffraction lines observed with the sintered diamond of this invention are believed to result primarily from a lattice strain and small crystallite size not found in conventional diamonds. The relative degree to which these characteristics contribute to the line broadening is not known, however, and the product is therefore described in terms of the total effect, i.e., in terms of the line broadening due to both properties. The unique line broadening property of the present product is seen in FIGURE 3, wherein the diffraction lines at the angle of greatest intensity of diffraction, i.e., at 44°, are much broader than they are for the unsintered diamond (FIGURE 4). Although the intensities of the lines in both FIGURES 3 and 4 appear the same, the lines obtained with the present product actually are less intense. In order to obtain the pattern in FIGURE 3 a higher X-ray intensity was used than for the diamond whose pattern is shown in FIGURE 4. With the same X-ray intensity the peaks in FIGURE 3 would be much lower. The small crystallite size and strain which are believed to contribute to the diffraction line broadening are advantageous in the product in that high strength is thereby achieved.

That the diamond product of this invention is comprised of crystals sintered together is shown at its clearest in FIGURE 2, wherein one can see locations (indicated by arrows S) where the boundary between crystals has been eliminated and there is a growing together of the crystals at these sites, the product shown having been made by sintering 1-micron-size natural diamond crystals.

The density of the sintered diamond of this invention depends chiefly on such process parameters as the shock pressure, particle size and initial density of the powder prior to sintering, whether impurities are present, whether the powder is degassed before sintering, etc. In general, the sintered product has a particle density equal to at least about 80 percent of the crystal density of diamond. However, higher densities can be achieved and are preferred for uses in which great strength is required.

The product formed by the process of this invention is obtained as a compact mass of particles of sintered diamond of various sizes mixed with some unsintered particles, the latter in an amount which varies depending on the conditions used, e.g., shock pressure and duration, initial particle size, etc. The compact mass is readily broken up to give a loose mass of discrete particles of diamond which can be separated according to sizes by known sieving methods. Particles of one millimeter or more in size can be obtained, although smaller particles are also formed, e.g., 50-micron particles. Sintered diamonds of at least 50-micron size are preferred since they find utility in a number of specific grinding and shaping operations.

The following examples illustrate the use of the present process in making the novel sintered diamond.

Example 1

Fifteen carats of yellow-green natural diamond powder in which all particles are in the 1–2.5 micron size range and having an impurity content of less than 4%, is pressed to form a 1-inch-diameter disc, 0.13 inch thick. The bulk density of the compressed powder is 50% of the crystal density of diamond. The disc is placed in the assembly shown in FIGURE 5. 1 is a cylindrical block of lead, 24 inches in diameter and 12 inches in height and having a cavity 2 2 inches deep and 5 inches in diameter. The block rests on a steel anvil. Steel cup-shaped member 4 has walls 1 inch thick and a base 1 inch thick. Steel ring 5 has a thickness of 1 inch and a height of 2 inches, and steel cover plate 6, a thickness of ⅛ inch. Filler member 7 is a lead cylinder 3 inches in diameter. To an acting surface of a flat steel plate 0.18 inch thick and 5 inches in diameter is attached a cylindrical layer of Compositons B (60/40 RDX/TNT containing 1% wax) 5 inches in diameter by 6 inches in height, the explosive layer being encased in a ¼-inch-thick steel sleeve. By means of wooden blocks, the explosive/plate assembly is supported 1.5 inches from lead block 1 with the free acting surface of the plate facing and parallel to cover plate 6. The explosive is initiated by a plane-wave generator, the detonation driving the plate against the surface of cover plate 6 at an impact velocity of 3.40 kilometers per second, thereby introducing into the cover plate a shock wave at a pressure of about 870 kilobars, the duration of which is about 1.1 microseconds. The shock pressure at the cover plate-diamond interface is about 250 kilobars, and the pressure of the shock reflected from the bottom of the cavity in steel cup-shaped member 4 is about 780 kilobars. As a result of a subsequent reflection from the cover plate before attenuation by a rarefaction wave from the back of the plate, an estimated pressure of about 870 kilobars is produced in the diamond. Ninety percent of the diamond powder is converted to discrete dark-gray sintered diamond particles, a large proportion of which are 1 millimeter in length and which have a density of about 90% the crystalline density of diamond. They scratch glass to form readily visible scratches, whereas the diamond powder from which they have been made does not produce any scratches on glass that are visible to the naked eye. The diamond gives the X-ray diffraction pattern shown in FIGURE 3. When an effort is made to comminute the sintered diamond by grinding in an agate mortar with an agate pestle, the agate chips severely and little comminution is achieved. When a cutting tool is made by metal-bonding the diamonds into a cutting tool head, the tool cuts a silicon carbide wheel with a ratio of silicon carbide wear to diamond wear greater than 100,000 to 1.

The percent impurities in the diamond powder used in the following examples is less than 2%.

Example 2

Six grams (29.3 carats) of natural diamond powder in the 1–3μ size range is cold pressed to form a 1-inch-diameter pellet having a density of 1.72 g./cc. The pellet is placed in an assembly essentially the same as that shown in FIGURE 5 utilizing a 0.12-inch-thick cover plate and then is explosively compacted to a thickness of 0.137 inch and a density of 3.4 g./cc. by means of a 5-inch-diameter 0.187-inch-thick steel plate driven to a velocity of 2.8 km./sec. by a 2-inch-thick, 5-inch-diameter layer of Composition B. Using the same assembly, this compact is then shocked by means of a 0.090-inch thick, 10-inch-diameter steel plate driven to an impact velocity of 4.5 km./sec. by 5-inch-thick, 10-inch-diameter Composition B. The initial shock pressure in the diamond is estimated to be about 1100 kilobars, the pressure being increased by subsequent reflections. The sintered diamond particles have a density equal to the crystalline density of diamond (3,5 g./cc.) and about 90% of the particles are at least 1 mm. long.

Example 3

15 carats of diamond powder synthesized by explosively shocking cast iron as described in copending, co-assigned application Ser. No. 413,247, filed Nov. 23, 1965, now abandoned, and having particle sizes in the 0–36 micron range is cold pressed to form a one-inch-diameter pellet having a density of 50% of the crystalline density of diamond. The pellet is placed in an assembly essentially as shown in FIGURE 5 under a 0.12-inch-thich cover plate. The pellet is then shocked by means of a 0.18-inch-thick steel plate, 5 inches in diameter driven to a velocity of 3.46 km./sec. by a 5-inch-diameter layer of Composition B having a density of 110 grams per square inch. The maximum shock pressure is estimated to be slightly in excess of 870 kilobars including reflections as in Example 1. A large proportion of the sintered diamond particles have a length of about 1 millimeter and a density of about 90% of the crystalline density of diamond. They readily scratch glass and tungsten carbide, and when an effort is made to comminute them in an agate mortar and pestle, the agate is severely chipped. A diamond point about ¼ inch diameter and ½ inch long composed of the sintered diamond particles bonded in a polymer matrix readily grinds tungsten carbide.

Example 4

Five grams of diamond powder (1–3 micron size range), consisting of 15% natural diamond and 85% of artificial diamond made by the static-pressure synthesis method (G.E. "Man-Made" Diamond) is pressed to form a 1-inch-diameter disc having a density of 1.90 g./cc., i.e., 54% of the crystal density of diamond. The disc is placed in the assembly shown in FIGURE 5, with the exception that, instead of resting in cup-shaped member 4, the disc rests directly on a magnesium cylinder 1-inch in diameter and 0.750 inch high, the magnesium resting in turn on a steel plate which is welded in the cavity. The cover plate 6 overlaps the steel ring 5 and is welded thereto. The disc is shocked by means of a 0.210-inch-thick, 10-inch-diameter steel plate driven to an impact velocity of 3.5 km./sec. by 5-inch-thick, 10-inch-diameter Composition B. This introduces a shock wave at a pressure of about 250 kilobars into the diamond at the cover plate-diamond interface, and a reflected-shock at a pressure of about 330 kilobars at the interface formed by the magnesium cylinder and the shocked diamond. No significant increase in pressure results from subsequent reflections. The length of the magnesium cylinder is such that the rarefaction wave from the back of the driver plate reaches the magnesium-diamond interface before the reflected shock from the magnesium-steel interface. The product is similar to that obtained as described in the preceding examples.

Example 5

The procedure of Example 4 is repeated except that an aluminum cylinder is substituted for the magnesium cylinder. In this case, the pressure of the shock wave reflected at the diamond-aluminum interface is about 500 kilobars. No significant increase in pressure results from subsequent reflections. The product is substantially the same as that obtained as described in the preceding examples.

Example 6

Thirty carats of diamond powder synthesized by explosively shocking cast iron as described in the aforementioned copending application, and having particle sizes in the range 12 to 22 microns is placed in the assembly shown in FIGURE 5, cup-shaped member 4 being made of steel and having a base 1¼ inch thick. The powder is pressed to 55% of the crystal density of diamond to form a disc having a diameter of 1⅜₆ inch and a thickness of 0.22 inch. The assembly of cup-shaped member 4 and powder 3 is sealed with cover plate 6, an evacuation opening being provided in the assembly. The assembly is then placed in a furnace and connected via copper tubing to a vacuum pump. The powder is outgassed at about 450° C. for 26 hours at $2 \times 10^{-4}$ torr. The assembly is sealed while still hot by crimping the copper tube close to the assembly, cutting the tube at the crimp, and soldering the crimped end. It is then placed in the lead block assembly shown in FIGURE 5, and the disc is shocked by means of a 0.225-inch-thick, 10-inch-diameter steel plate driven to an impact velocity of 3.5 kilometers per second by 5-inch-thick, 10-inch-diameter Composition B. The pressures to which the diamond is subjected are substantially those given in Example 1. The sintered diamond obtained by this procedure has a density of 2.94 g./cc. (84% crystalline density of diamond), and has superior resistance to crushing and attrition while abrading hard materials, believed to be a result of the out-gassing of volatilizable materials from the powder prior to shocking.

I claim:

1. A process for sintering together initially distinct particles of diamond powder having an average particle size less than about 150 microns and a bulk density equal to at least about 40% of the crystalline density of diamond, which comprises applying over at least one surface of a confined mass of said diamond powder, a shock pressure pulse of sufficient intensity to subject the diamond powder to a shock wave at a pressure of at least about 300 kilobars, whereby initially distinct particles of said powder are bonded directly to each other.

2. A process of claim 1 wherein said shock pressure pulse is applied to the surface of the diamond powder by impacting said surface with an explosively driven metal projectile plate.

3. A process of claim 1 wherein said shock pressure pulse is applied to the surface of the diamond powder by explosively driving a metal projectile plate against an exterior surface of a metal container which encloses the diamond powder.

4. A process of claim 1 wherein said shock pressure pulse is applied to the surface of the diamond powder by detonating a layer of explosive in contact with an exterior surface of a metal container which encloses the diamond powder.

5. A process of claim 1 wherein the shock pressure is at least about 600 kilobars and the bulk density of said mass is about from 45 to 55 percent of the crystalline density of diamond.

6. A process of claim 3 wherein the projectile plate has a shock impedance of about from $4 \times 10^6$ to $5 \times 10^6$ dyne-sec./cm.$^3$ and a velocity on impact of at least about 3.0 kilometers per second.

7. A process of claim 3 wherein the diamond powder consists of synthetic diamond containing less than about two percent of impurities by weight.

8. A process for sintering together initially distinct particles of diamond powder having an average particle size less than about 150 microns and a bulk density equal to at least about 40% of the crystalline density of diamond, which comprises enclosing a mass of said diamond powder in a metal container; subjecting said mass to a shock wave at a pressure of at least about 300 kilobars by propelling a metal projectile plate against an exterior surface of the metal container, said projectile plate having a shock impedance of from about $4 \times 10^6$ to $5 \times 10^6$ dyne-sec./cm.$^3$ and a velocity on impact of at least about 3 kilometers per second, and thereafter recovering sintered diamond particles from said metal container.

References Cited

UNITED STATES PATENTS

| | | | |
|---|---|---|---|
| 3,081,498 | 3/1963 | Davis et al. | 264—84 |
| 3,141,746 | 7/1964 | De Lai | 51—307 |
| 3,238,019 | 3/1966 | De Carli | 23—209.1 |

OTHER REFERENCES

Bundy: "Jr. of Chemical Physics," vol. 38, No. 3, Feb. 1, 1963, pp. 631–643.

OSCAR R. VERTIZ, *Primary Examiner.*

EDWARD J. MEROS, *Assistant Examiner.*